United States Patent [19]
Myrick et al.

[11] Patent Number: 5,978,852
[45] Date of Patent: Nov. 2, 1999

[54] LAN SWITCH INTERFACE FOR PROVIDING ARBITRATION BETWEEN DIFFERENT SIMULTANEOUS MEMORY ACCESS REQUESTS

[75] Inventors: Brian J. Myrick, Boxborough; Gary D. Lorenz, Acton; Charles R. Weaver, Leominster, all of Mass.

[73] Assignee: 3Com Corporation, Santa Clara, Calif.

[21] Appl. No.: 09/003,230

[22] Filed: Jan. 6, 1998

[51] Int. Cl.[6] .................................................. G06F 13/362
[52] U.S. Cl. .......................... 709/238; 710/244; 711/151
[58] Field of Search .................................... 709/102, 103, 709/213, 215, 238; 710/240, 244; 711/106, 150, 151, 158, 167, 168; 370/360, 379, 382, 401

[56] References Cited

U.S. PATENT DOCUMENTS

| | | | |
|---|---|---|---|
| 5,751,955 | 5/1998 | Sonnier et al. | 709/400 |
| 5,787,075 | 7/1998 | Uchida | 370/252 |
| 5,802,278 | 9/1998 | Isfeld et al. | 709/249 |
| 5,889,776 | 3/1999 | Liang | 370/389 |
| 5,889,949 | 3/1999 | Charles | 709/214 |

*Primary Examiner*—Viet D. Vu
*Attorney, Agent, or Firm*—McGlew and Tuttle, PC.

[57] ABSTRACT

A plural interface LAN switch arbitration method dividing access to a packet memory into a plurality of sequential cycles. A refresher is provided for refreshing the packet memory and the refresher issues a refresher request when the refresher needs to access the packet memory. A first and second interface are provided for transferring data between the packet memory and the respective first and second LAN's. The first and second interface issue a respective first and second interface request when the respective interface needs to access the packet memory. A processor is provided for updating the packet memory and issues a processor request when the processor needs to access the packet memory. The arbitration provides the refresher with an immediately next cycle of the memory when the refresher request is present. The arbitration method also provides the processor with an immediately next cycle of the packet memory when the processor request is present and the refresher has a present cycle which guarantees the processor periodic access to the memory.

18 Claims, 4 Drawing Sheets

FIG. 2A

A/FIRST INTERFACE

| | | | | |
|---|---|---|---|---|
| Refresher | 0 | 0 | 0 | 0 |
| refresher last cycle | 0 | 0 | X | X |
| processor | X | X | 0 | 0 |
| A request | 1 | 1 | 1 | 1 |
| A last interface | X | 0 | X | 0 |
| B request | 0 | 1 | 0 | 1 |
| B last interface | X | X | X | X |

FIG. 2B

B/SECOND INTERFACE

| | | | | |
|---|---|---|---|---|
| Refresher | 0 | 0 | 0 | 0 |
| refresher last cycle | 0 | 0 | X | X |
| processor | X | X | 0 | 0 |
| A request | 0 | X | 0 | 1 |
| A last interface | X | 1 | X | 1 |
| B request | 1 | 1 | 1 | 1 |
| B last interface | X | X | X | 0 |

LAN SWITCH INTERFACE FOR PROVIDING ARBITRATION BETWEEN DIFFERENT SIMULTANEOUS MEMORY ACCESS REQUESTS

FIELD OF THE INVENTION

The present invention relates to a switch in a local area network (LAN), and in particular to arbitration used to determine access when a plurality of LAN interfaces, an address table updating processor and a memory refresher need to access a memory which can only be accessed by one entity at a time.

BACKGROUND OF THE INVENTION

Switches connect two or more separate LAN's. The switch has ports for LAN interfaces which connect individually to separate LAN's. A packet which is present on a first LAN, is read by the switch, and the switch determines from the destination address of the packet, whether the packet should be transmitted to a second LAN. The switch reads the destination address, and through the use of a look-up table in the memory, determines if the destination address is in the first or second LAN. If the destination address is in the second LAN, the packet is forwarded to the port or interface for the second LAN. If the destination address is in the first LAN, the switch does not forward the packet to the second LAN. If the look-up table in the memory does not have an entry for that particular destination address, the switch can either ignore the packet or forward the packet to all its ports or LAN interfaces. Likewise a packet circulating in the second LAN is read by the second LAN interface means, and the destination address of this packet is compared with the look-up table in the memory to determine if the destination address of the packet from the second LAN is located in the first LAN. A decision as to what to do with a packet having a destination address not listed in the look-up table, depends on the configuration of the switch.

As networks grow larger and larger, and the workstations connected to the network change, the address look-up table in the switch must correspondingly change. It is possible to change the address look-up table manually each time a change is made to one of the networks connected to the switch. However, this can be time consuming and require much effort on behalf of the manager of the computer network.

It is also possible to have the switch automatically update the look-up table. A processor in the look-up table reads the source address of all packets received on each LAN interface. The processor then knows that the LAN of the respective interface contains the workstations having the source address of the packets received on the respective interface. The processor then uses this information to update the address look-up tables. In this way, as soon as a workstation sends a packet onto the first LAN, and the processor in the switch reads the packet, the address look-up table in the switch can be updated to indicate that the particular workstation resides on the first LAN. This allows the look-up table to be updated automatically.

Whether or not the look-up table is updated automatically, or manually, the memory which stores the look-up table needs to be accessed by all of the LAN interfaces, and the processor which performs the updating. Depending on the type of memory, only one device is able to access the memory at one time, or only one device is able to access a particular memory location at a time.

SUMMARY AND OBJECTS OF THE INVENTION

It is a primary object of the present invention to provide an arbitration between different simultaneous requests for the memory, and to provide a particular type of memory, which together optimize performance of the switch.

The present invention accomplishes this object by using a Dynamic Random Access Memory (DRAM). The performance, requirements and cost of a DRAM are very well suited to a multi-interface LAN switch. One of the requirements of the DRAM of the present invention is that the DRAM needs to be periodically refreshed in order to keep the information or data in the DRAM. A refresher means therefore needs to accompany the DRAM to maintain the information in the DRAM. This results in another device which needs access to the memory.

The refresher access to the memory is very important, since if the DRAM is not timely refreshed, all data in the DRAM is lost.

Therefore, the present invention includes an arbitration where the refresher, the address table processor, and each interface issues a request for the memory when each respective device needs to access the memory. The arbitration process and/or means divides access to the memory into a plurality of sequential cycles or periods. The arbitration also receives the requests from the individual devices.

The refresher request is the most important, and is given the highest priority. When the arbitration receives a refresher request, the arbitration assigns the refresher to the immediate or very next cycle of the memory.

One of the more important features of a switch, is how fast it can process a received packet. The faster the switch can process a packet, the faster data can travel from one workstation to another, and high data rates are very much desired in todays computer networks. Therefore, there is a tendency to give the interfaces of a switch a higher priority than the address table updating process. This can be detrimental, since in very congested networks, it can take a relatively long amount of time before an address table is updated. A non-updated look-up table prevents a new workstation from receiving and transmitting packets to a different LAN. An non updated look-up table also reduces the performance of the combined networks, in that the changed workstation will either continue sending packets until the switch is updated, or packets will be forwarded unnecessarily to LAN's where they are not needed. Therefore it is necessary to timely update the address look-up table, even in congested networks since an outdated look-up table could increase congestion even further.

In the present invention, the address update processor is guaranteed period access to the memory if needed. As described above, the arbitration of the present invention gives the refresher the immediately next cycle of the memory upon receipt of a refresher request, regardless of the presence of interface or processor requests. The next highest priority is given to the LAN interfaces. The arbitration alternates priority between the interfaces to equally divide the interfaces access to the memory.

In times of constant requests by the interfaces, an address update processor request could go unfilled indefinitely. To avoid this, the present invention gives the processor request highest priority to a memory cycle immediately after the refresher has a memory cycle. Therefore if a processor request is present when the refresher gains access to the memory, the processor will have access to the immediately next memory cycle. This ensures that the address update processor will be allowed to periodically update the memory even during times of constant requests by the LAN interfaces.

The arbitration of the present invention, in combination with the DRAM, provides for a simple and efficient arbitration in a LAN switch with a plurality of interfaces.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIGS. 2A, 2B are tables showing the combination of signals to give the first and second interfaces access to the memory;

DESCRIPTION OF THE PREFERRED EMBODIMENT

Figure 1:
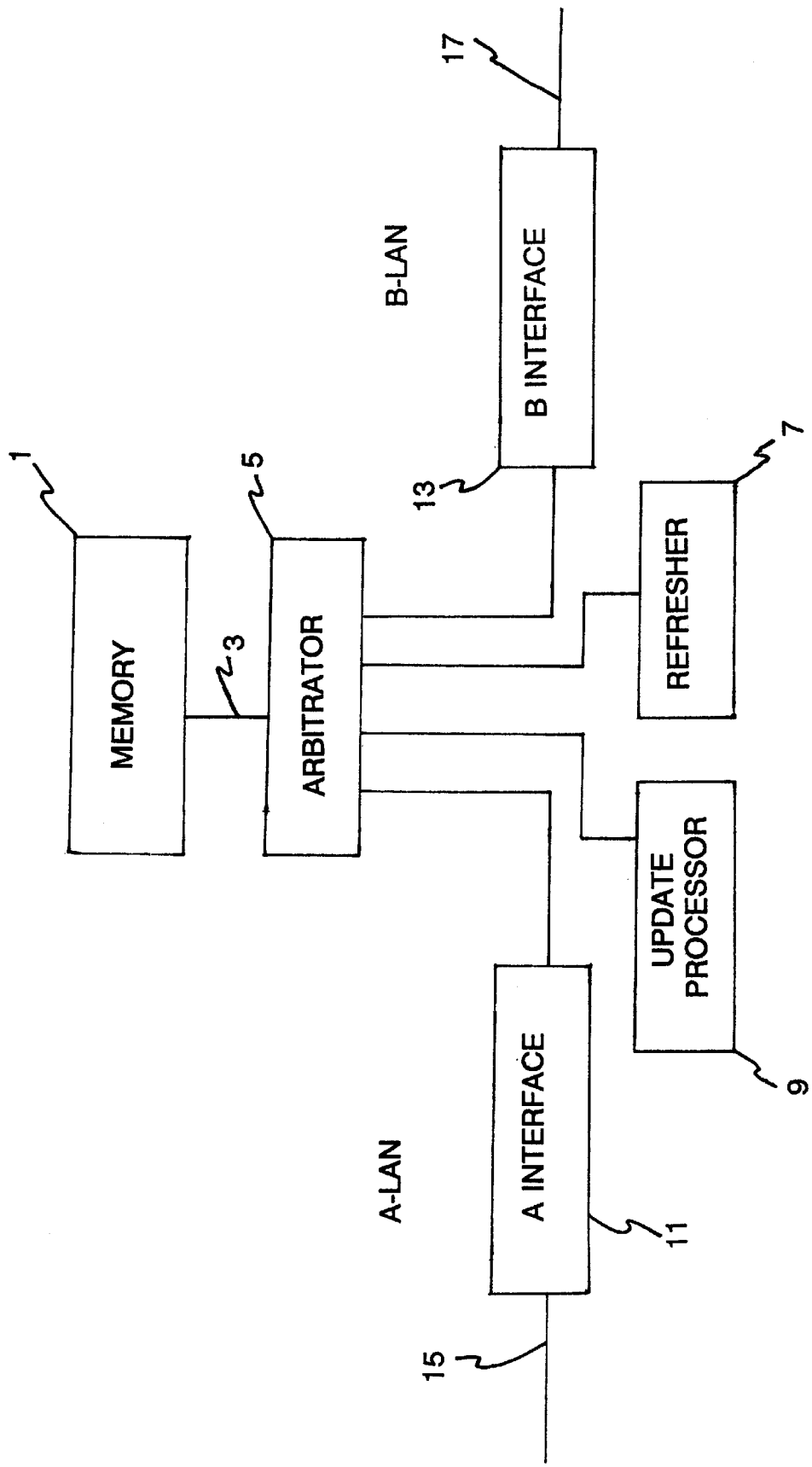
FIG. 1 is a block diagram of the various devices involved in the arbitration of the present invention.

Referring to the drawings, and in particular to FIG. 1, a memory 1 contains an access point 3 which can only be utilized by one device at a time. The memory 1 can be a magnetic, optical or electrical memory, or any other memory which is capable of storing information. Connected to this access point 3 is an arbitrator means 5 which divides access to the memory 1 into a plurality or series of sequential memory cycles, and decides which one of a plurality of devices can access the memory 1 through the access point 3.

In the preferred embodiment, there are four devices which need to access the memory 1. These devices are a memory refresher 7 and address update processor 9 a first or A-LAN interface 11 and a second or B-LAN interface 13. The memory refresher 7 needs to access the memory 1 periodically to refresh the information stored in the memory 1. The memory 1 is preferably a DRAM where the information is electronically refreshed. The first LAN interface 11 connects to and communicates with the first LAN 15. The second LAN interface 13 is connected to and communicates with the second LAN 17. The address update processor 9 updates the address look-up tables in the memory 1 based on changes to the first and second LAN's 15, 17 which have either been automatically detected or manually entered into the switch. All of the devices 7, 9, 11 and 13 can be considered independent processors since they process data independently from each other.

In the arbitration of the present invention, each of the devices 7, 9, 11 and 13 issue a request for access to the memory 1. The refresher issues a request periodically, usually at fixed intervals, in order to access the memory to maintain the information in the memory. The address update processor issues a request for access to the memory 1 whenever a change needs to be made to the address look-up tables in the memory 1. The timing of address update processor requests is random and depends on changes made to the first and second LAN's 15, 17, which is also a random occurrence. First and second LAN interface means 11, 13 also randomly need access to the memory 1, and their requests depend on the arrival of packets to the respective LAN interfaces. The arrival of packets is random, and therefore the LAN interfaces 11 and 13 randomly need access to the memory 1.

Since the information stored in the memory 1 will be lost without the periodic refreshing from the memory refresher 7, the arbitrator 5 gives highest priority to requests from the memory refresher 7. When the arbitrator 5 receives a request from the memory refresher 7, the arbitrator 5 gives the memory refresher 7 access to the immediately next cycle of the memory 1. In this way, it is guaranteed that the information in the memory 1 will be maintained.

The priority of requests from the first and second LAN interfaces 11, 13 is substantially equal. In order to give each LAN interface equal access to the memory 1, the arbitrator 5 maintains a record of which LAN interface last accessed the memory. In situations where both the LAN interfaces are requesting access to the memory 1, the arbitrator determines which LAN interface accessed last, and then chooses the other LAN interface. This gives the LAN interfaces equal access to the memory 1.

The desired priority of the address update processor 9 is a little less than the desired priority for the LAN interfaces. However, giving the LAN interfaces priority over the address update processor can result in indefinitely preventing the address update processor from accessing the memory when traffic on either one, or both of the LAN's 15, 17 is consistently heavy. Failure of the look-up table in the memory 1 to be properly updated, can further increase the amount of traffic on the first and second LAN's, as well as severely inconvenience those workstations on the first and second LAN's which have had their addresses changed. Therefore, it is not desirable to indefinitely hold off updating the memory 1. In order to insure that the memory 1 is timely updated, the arbitrator 5 gives the address update processor 9 access to the immediately next cycle of the memory when the address update processor has a request and the memory refresher 7 is presently accessing the memory 1 through a present memory cycle. Once a device receives access to the memory 1, the memory request is removed. On the other hand, the memory request remains present until that particular device has received access to the memory. In this way, it is guaranteed that address update processor 9 will always have periodic access to the memory 1 whenever needed.

Using this priority scheme, the memory refresher 7 is always given an immediately next cycle of the memory whenever a refresher request is present. The address look-up processor 9 is always given an immediately next cycle of the memory when the address update processor request is present and the memory refresher 7 has a present memory cycle. If only the address update processor request is present, then the processor receives the immediately next memory cycle.

The first LAN interface 11 receives an immediately next cycle of the memory when the first interface request is present, no refresher request is present, either the processor request is not present or the refresher does not have a present cycle, and either the second LAN interface request is not present or the second interface was a last one of the LAN interfaces to access the memory. The first LAN interface also gains access to an immediately next cycle of the memory when the first interface request is present, no refresher request is present, either the processor request is not present or the refresher does not have a present cycle, and either the second interface request is not present or the first interface means was not a last one of the interfaces to access the packet memory. If the first interface means has the only request for the memory, then the first interface receives access to the immediately next memory cycle. The combination of the different signals which give the first LAN interface 11 access to the immediately next cycle is shown in FIG. 2A, where 0 indicates that a request or signal is not present, 1 indicates that a request or signal is present, and X indicates that the condition of the request or signal need not be considered.

A similar logic is present for the second LAN interface 13. The only minor difference is that the first interface is given priority upon initial start-up of the switch. The combinations of signals to give the second LAN interface access to the immediately next memory cycle is shown in FIG. 2B.

Figure 3:
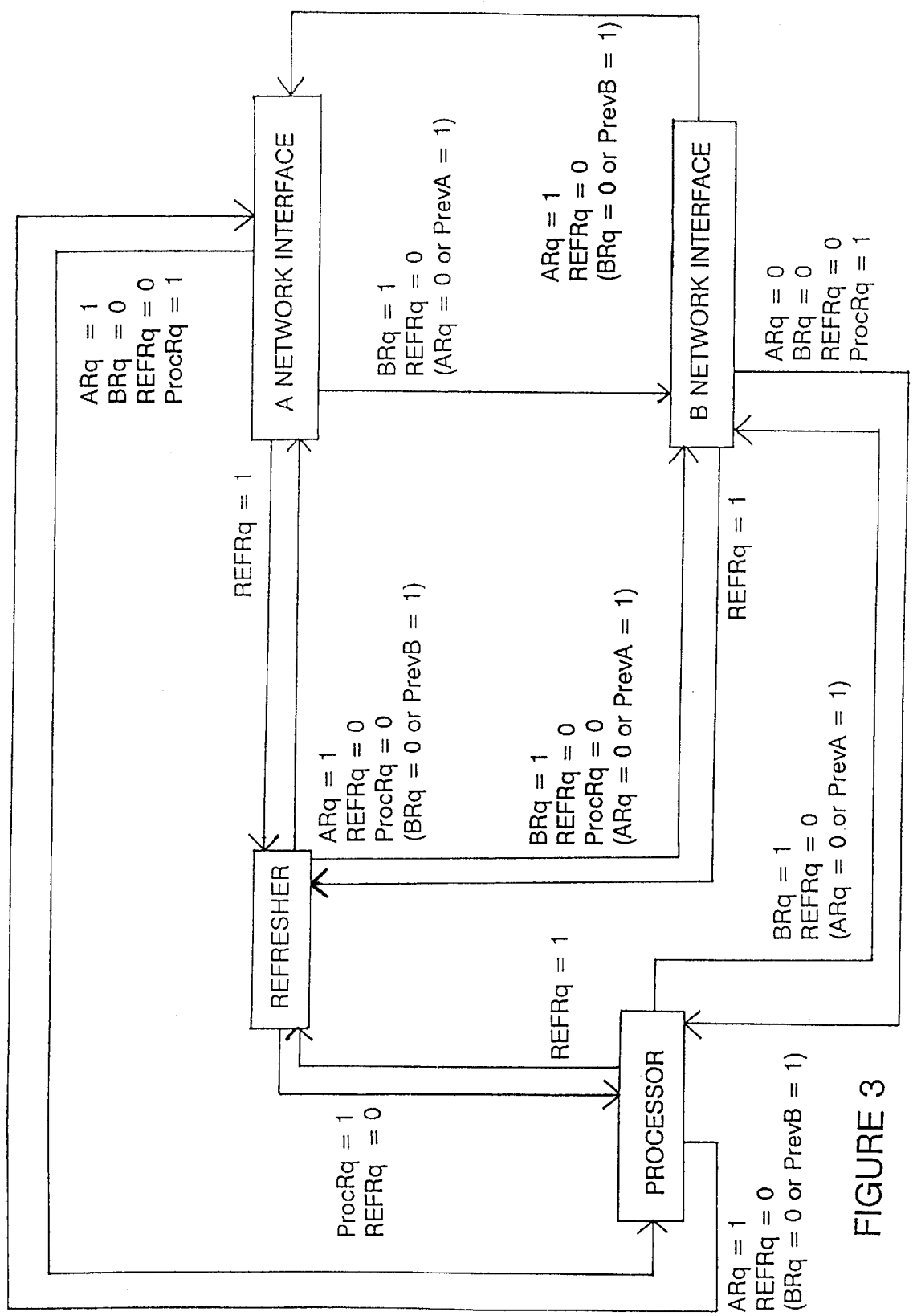
FIG. 3 is a state diagram of the arbitration.

FIG. 3 shows a state diagram of how access is transferred among the four devices depending on the conditions of the various signals. In FIG. 3, the number 1 indicates that a particular signal is present, and 0 indicates that the particular signal is not present. The embodiment of FIG. 3 also assumes that the arbitration will continue to give the last device access to the memory if no new requests are received.

Figure 4:
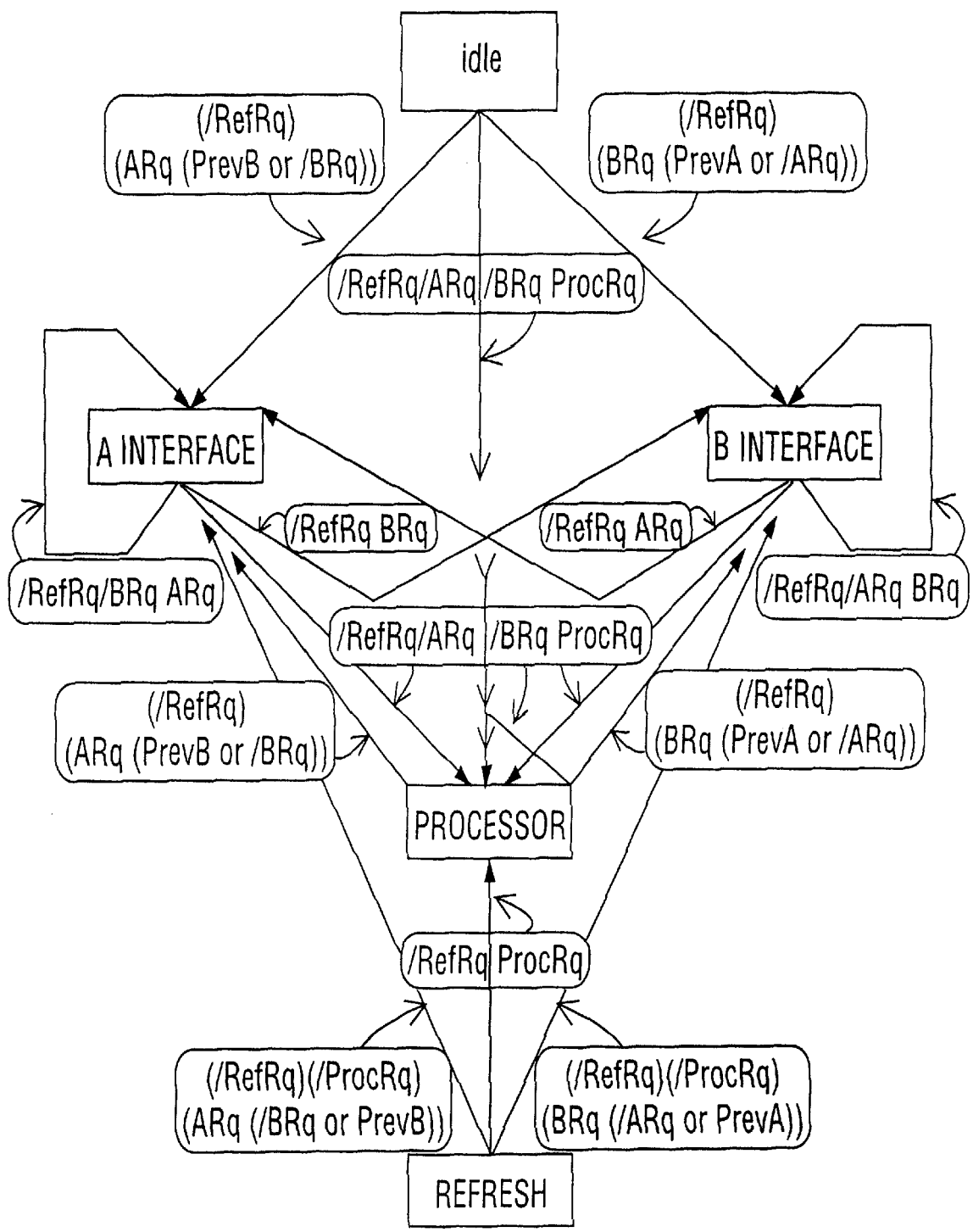
FIG. 4 is another state diagram of the arbitration.

FIG. 4 shows a state machine for the present invention where an idle state is included and the arbitrator 5 goes into the idle state wherein no memory requests are received. There are two transitions from each state in FIG. 4 which are not shown in order to reduce the complexity of FIG. 4. In any state, if RefRQ (refresher request) is asserted, the arbitrator proceeds to the refresher state regardless of any other signals. Also the transition to the idle state if no requests are asserted is also not shown. In FIG. 4, the "/" symbol represents the NOT function and is applied to the immediately following signal. The logical AND function is implied in all occasions for all signals unless the logical OR function is explicitly stated.

The important feature of the present invention is that the refresher periodically refreshes the memory, and always receives highest priority, along with the processor receiving highest priority when the refresher has a present memory cycle. Access for the LAN interfaces, is then divided equally.

In the preferred embodiment, first and second LAN interfaces have been shown. The concepts of the present invention can be carried over to switches where more than two LAN interfaces are present, and where LAN access to the memory is either divided equally among the LAN interfaces present, or access is divided unequally among the different LAN interfaces.

The features described in the specification, drawings, abstract and claims, can be used individually and in arbitrary combinations for practicing the present invention.

While specific embodiments of the invention have been shown and described in detail to illustrate the application of the principles of the invention, it will be understood that the invention may be embodied otherwise without departing from such principles.

What is claimed is:

1. A plural interface LAN switch arbitration for packet memory, the arbitration comprising the steps of:
    dividing access to said packet memory into a plurality of sequential cycles;
    providing refresher means for refreshing said packet memory, said refresher means issuing a refresher request when said refresher means wants to access said packet memory;
    providing first interface means for transferring data between said packet memory and a first LAN, said first interface means issuing a first interface request when said first interface means wants to access said packet memory;
    providing second interface means for transferring data between said packet memory and a second LAN, said second interface means issuing a second interface request when said second interface means wants to access said packet memory;
    providing processor means for updating a look-up table in said packet memory, said processor means issuing a processor request when said processor means wants to access said packet memory;
    providing said refresher means with an immediately next cycle of said packet memory when said refresher request is present;
    providing said processor means with an immediately next cycle of said packet memory when said processor request is present and said refresher means has a present cycle.

2. An arbitration in accordance with claim 1, further comprising:
    always providing said first interface means with an immediately next cycle of said packet memory when said first interface request is present, no refresher request is present, either said processor request is not present or said refresher does not have a present cycle, and either said second interface request is not present or said second interface means was a last one of said interfaces means to access said packet memory.

3. An arbitration in accordance with claim 1, further comprising:
    always providing said first interface means with an immediately next cycle of said packet memory when said first interface request is present, no refresher request is present, either said processor request is not present or said refresher does not have a present cycle, and either said second interface request is not present or said first interface means was not a last one of said interfaces means to access said packet memory.

4. An arbitration in accordance with claim 1, further comprising:
    always providing said second interface means with an immediately next cycle of said packet memory when said second interface request is present, no refresher request is present, either said processor request is not present or said refresher does not have a present cycle, and either said first interface request is not present or said first interface means was a last one of said interfaces means to access said packet memory.

5. An arbitration in accordance with claim 2, further comprising:
    always providing said second interface means with an immediately next cycle of said packet memory when said second interface request is present, no refresher request is present, either said processor request is not present or said refresher does not have a present cycle, and either said first interface request is not present or said first interface means was a last one of said interfaces means to access said packet memory.

6. An arbitration in accordance with claim 3, further comprising:
    always providing said second interface means with an immediately next cycle of said packet memory when said second interface request is present, no refresher request is present, either said processor request is not present or said refresher does not have a present cycle, and either said first interface request is not present or said first interface means was a last one of said interfaces means to access said packet memory.

7. An arbitration in accordance with claim 1, further comprising:

always providing said second interface means with an immediately next cycle of said packet memory when said second interface request is present, no refresher request is present, either said processor request is not present or said refresher does not have a present cycle, and either said first interface request is not present or said second interface means was not a last one of said interfaces means to access said packet memory.

8. An arbitration in accordance with claim 1, further comprising:

always providing said refresher means with an immediately next cycle of said packet memory when said refresher request is present;

always providing said processor means with an immediately next cycle of said packet memory when said processor request is present and said refresher means has a present cycle.

9. A plural interface LAN switch comprising:

memory means for storing information of packets received by the switch;

refresher means for refreshing said memory means, said refresher means issuing a refresher request when said refresher means wants to access said memory means;

first interface means for transferring data between said memory means and a first LAN, said first interface means issuing a first interface request when said first interface means wants to access said memory means;

second interface means for transferring data between said memory means and a second LAN, said second interface means issuing a second interface request when said second interface means wants to access said memory means;

processor means for updating said memory means, said processor means issuing a processor request when said processor means wants to access said memory means;

arbitration means for dividing access to said memory means into a plurality of sequential cycles, said arbitration means receiving said refresher request, said first interface request, said second interface request, and said processor request, said arbitration means providing said refresher means with an immediately next cycle of said memory means when said refresher request is present, said arbitration means providing said processor means with an immediately next cycle of said memory means when said processor request is present and said refresher means has a present cycle.

10. A switch in accordance with claim 9, wherein:

said memory means includes a look up table;

said processor means updates said lookup table in said memory means.

11. A switch in accordance with claim 9, wherein:

said arbitration means provides said first interface means with an immediately next cycle of said memory means when said first interface request is present, no refresher request is present, either said processor request is not present or said refresher does not have a present cycle, and either said second interface request is not present or said second interface means was a last one of said interfaces means to access said memory means.

12. A switch in accordance with claim 9, wherein:

said arbitration means provides said first interface means with an immediately next cycle of said memory means when said first interface request is present, no refresher request is present, either said processor request is not present or said refresher does not have a present cycle, and either said second interface request is not present or said first interface means was not a last one of said interfaces means to access said memory means.

13. A switch in accordance with claim 9, wherein:

said arbitration means provides said second interface means with an immediately next cycle of said memory means when said second interface request is present, no refresher request is present, either said processor request is not present or said refresher does not have a present cycle, and either said first interface request is not present or said first interface means was a last one of said interfaces means to access said memory means.

14. A switch in accordance with claim 11, wherein:

said arbitration means provides said second interface means with an immediately next cycle of said memory means when said second interface request is present, no refresher request is present, either said processor request is not present or said refresher does not have a present cycle, and either said first interface request is not present or said first interface means was a last one of said interfaces means to access said memory means.

15. A switch in accordance with claim 12, wherein:

said arbitration means provides said second interface means with an immediately next cycle of said memory means when said second interface request is present, no refresher request is present, either said processor request is not present or said refresher does not have a present cycle, and either said first interface request is not present or said first interface means was a last one of said interfaces means to access said memory means.

16. A switch in accordance with claim 9, wherein:

said arbitration means provides said second interface means with an immediately next cycle of said memory means when said second interface request is present, no refresher request is present, either said processor request is not present or said refresher does not have a present cycle, and either said first interface request is not present or said second interface means was not a last one of said interfaces means to access said memory means.

17. A switch in accordance with claim 9, wherein:

said arbitration means always provides said processor means with said immediately next cycle of said memory means when said processor request is present and said refresher means has said present cycle.

18. A switch in accordance with claim 17, wherein:

said arbitration means always provides said refresher means with said immediately next cycle of said memory means when said refresher request is present.

* * * * *